United States Patent [19]

Salaün

[11] 4,362,305
[45] Dec. 7, 1982

[54] PUMP SEALING DEVICE

[75] Inventor: André Salaün, Colombes, France

[73] Assignee: Societe Anonyme dite: Compagnie Generale d'Automatisme, Paris, France

[21] Appl. No.: 131,886

[22] Filed: Mar. 19, 1980

[30] Foreign Application Priority Data

Mar. 26, 1979 [FR] France .............................. 79 07521

[51] Int. Cl.³ .............................................. F16J 15/18
[52] U.S. Cl. .................................................. 277/113
[58] Field of Search ......................... 277/113, 102, 114

[56] References Cited

U.S. PATENT DOCUMENTS 1,603,364  10/1926  Tamini ................................ 277/113

FOREIGN PATENT DOCUMENTS 1080570  4/1960  Fed. Rep. of Germany.
2460314  7/1975  Fed. Rep. of Germany.
2632649  2/1977  Fed. Rep. of Germany.
   5726  of 1896  United Kingdom ................ 277/113

OTHER PUBLICATIONS

Energie Fluide, vol. 11, No. 55, Oct. 1972, pp. 20–21: "Pompe Centrifuge sous Presse Étoupe pour Industries Chimiques."

Primary Examiner—Robert I. Smith
Attorney, Agent, or Firm—Kenyon & Kenyon

[57] ABSTRACT

A pump sealing device includes a packing box whose packing (3) is disposed around a drive shaft (2) of the pump where the shaft passes through the pump body (1). The packing is acted on by a gland (4). At least two levers (5), each of which pivots on a respective pin (6), are arranged so that one end of each lever is able to exert a predetermined pressure on said rammer as soon as the pump stops and conversely to reduce the pressure to zero or substantially zero before the pump is started. The other ends of the levers are linked to means (8) to cause the levers to rotate about the pins.

The device can be used in any type of pump, and in particular in pumps for corrosive liquids.

7 Claims, 3 Drawing Figures

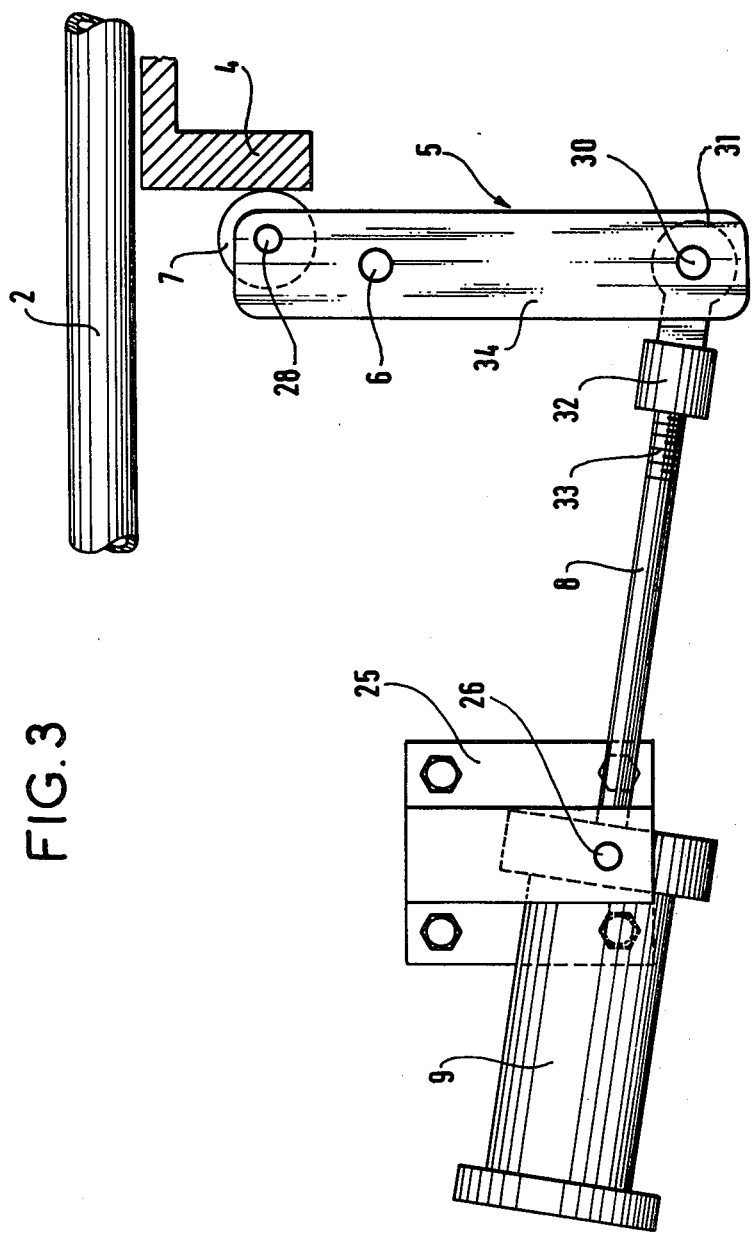

PUMP SEALING DEVICE

The present invention provides a pump sealing device and more particularly a sealing device for corrosive fluid pumps.

BACKGROUND TO THE INVENTION

It is known that the sealing problem between a pump shaft and a pump body where the shaft leaves the body is generally imperfectly solved. Consequently, although slight leakages of inert liquids such as water can be tolerated, when said pump pumps a corrosive fluid such as an acid, possibly at high temperature, there must be no leakage at all.

Devices usually used to provide such sealing include packing boxes and rotating seals with mechanical packing, such arrangements being necessarily disposed between the pump shaft and the pump body.

Now, it is known that such devices wear more or less rapidly, especially when the pump conveys liquids which contain solid particles in suspension; therefore, sealing rapidly becomes incomplete. One remedy to such a drawback is to use a hydrodynamic discharge pump fixed on the shaft inside the pump body, in the neighbourhood of the output of said shaft. Such a turbine, which is generally an impeller wheel, produces a suction at the output of the shaft, thereby preventing the fluid from remaining permanently at the shaft output.

However, when the pump stops, sealing must be provided. This requires a packing box to be tightened by means of screws. Of course, the box must be loosened before the pump is subsequently restarted, since if this is not done, the packing box rapidly seizes, thereby putting the pump out of action.

The need to tighten and loosen the packing box by hand when the pump is stopped and started is a hindrance, especially in an industrial installation where a large number of pumps are generally used, since as previously mentioned, neglecting such operations can lead to putting a pump out of action and to shutting down an installation.

The present invention provides a means of performing such tightening and loosening operations automatically and reliably by using a simple and inexpensive device which is described hereinbelow.

SUMMARY OF THE INVENTION

The invention provides a pump sealing device of the type which includes a packing box whose packing is disposed around a drive shaft of the pump where the shaft passes through the pump body, it being possible to clamp compress said packing with a gland, wherein the device includes a least two levers which can each be made to rotate about respective pins so that one end of each lever is able to exert a predetermined pressure on said gland as soon as the pump stops and conversely to reduce said pressure to zero or substantially zero before said pump is started, the other end of each lever being linked to means to rotate said lever about said pin.

BRIEF DESCRIPTION OF THE DRAWINGS

Other characteristics and advantages of the invention are apparent from the following description given by way of a purely illustrative example which has no limiting character, with reference to the accompanying drawings in which:

FIG. 3 is a plan view of FIG. 2.

FIG. 1 shows the body 1 of a pump whose power unit such as an impeller or the like (not shown) is driven by a motor 36 through a shaft 2. Reference numeral 3 designates packing disposed where said shaft leaves the pump body. Said packing can be compressed by means of a part 4 called a gland which is concentric with the shaft. Two levers 5 can pivot about pins 6. Each of said levers has a roller 7 at one of its ends, the other end being connected to a respective connecting rod 8 which is driven by a double-acting piston of a respective pneumatic jack 9.

Figure 1:
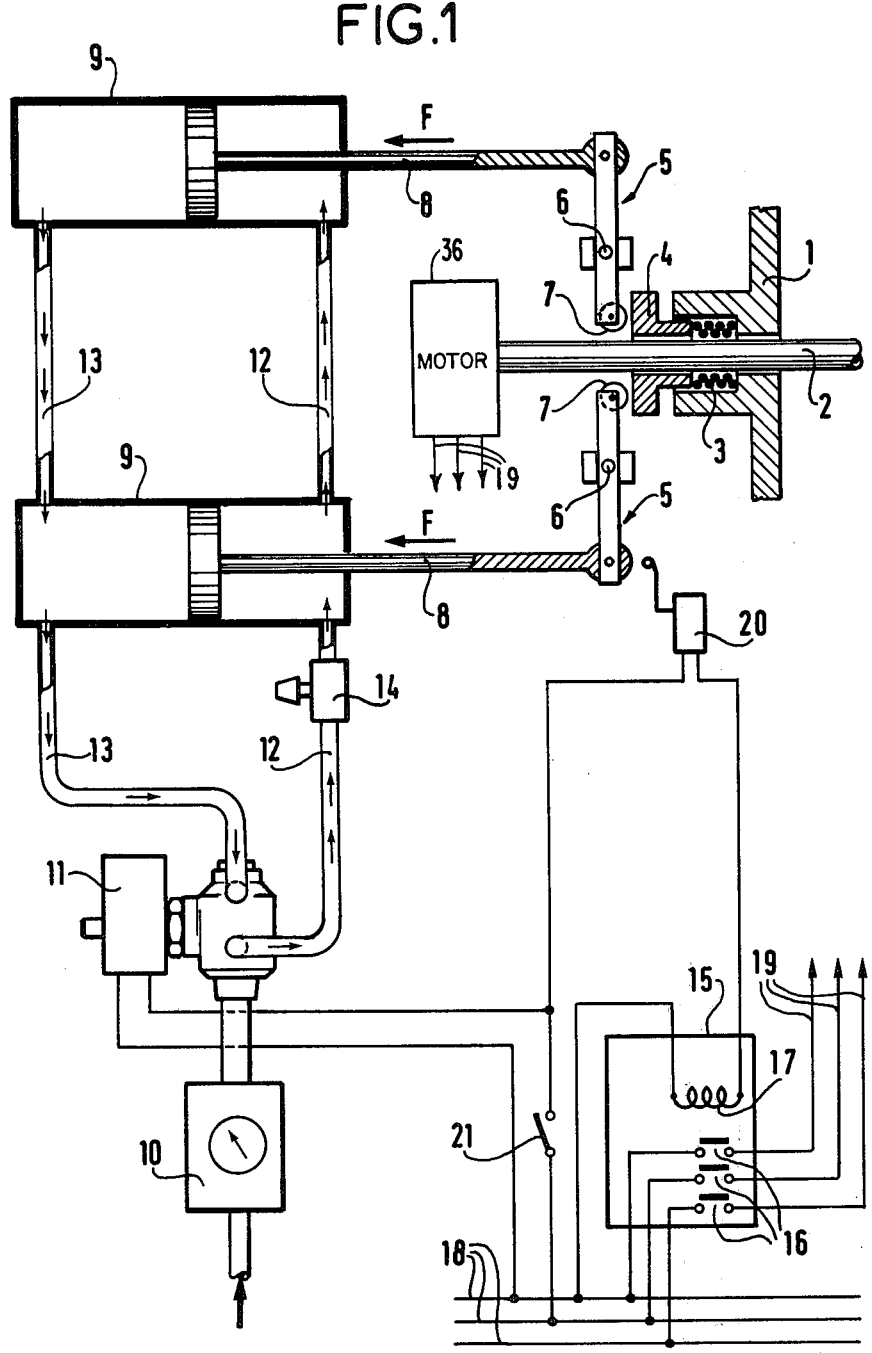
FIG. 1 is a general schematic view of the device in accordance with the invention.

The two jacks are supplied by a source of compressed air (not shown) via a pressure-reducing valve 10 and a four-way electrically operated valve 11 which is suitable for establishing the air pressure in either one of the two compartments of each jack while removing air from the other of the two compartments via pipes 12 and 13. A unit 14 for regulating the air admission speed is disposed in the pipe 12.

Further, reference numeral 15 designates a circuit-breaker whose contacts 16 are controlled by a solenoid 17 and which feed the motor 36 of the pump from three-phase mains 18 via conductors 19. It is also seen that the winding 17 is connected to the mains via a switch 21 and via a cut-off unit or normally open micro-switch 20 operated by one of the levers 5. The electrically-operated valve 11 is connected to said mains via said switch 21.

Figure 2:
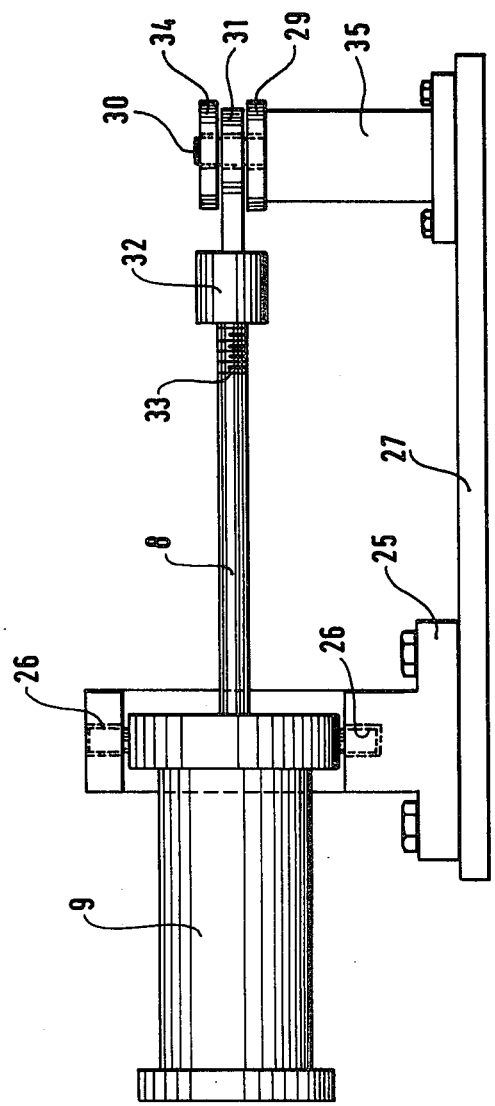
FIG. 2 shows in detail the structure of some components in FIG. 1.

FIGS. 2 and 3 show that each jack is installed on a support 25 by means of two vertical gudgeons 26 so that it can oscillate in a horizontal plane to provide smoother operation. The support 25 is fixed to a base 27 which can be mounted on the frame of the pump. The figures also show that each of the levers 5 is formed by two flat bars 29 and 34 separated by spacers (not shown) and between which are installed the roller 7, on a pin 28, and the crosshead 31 fixed by a pin 30. The pin 6 is itself installed on a support 35 fixed to said base 27. Also, an adjusting nut 32 can co-operate with a threaded portion 33 of the connecting rod 8 in order to adjust the position of the lever 5 with respect to the gland 4.

Such a device operates as follows.

Assuming that the pump is not running, the electrically operated valve 11 is connected so that when it is not actuated, compressed air fills the right-hand compartments of the jacks 9 via the pipes 12. In this way, the connecting rods 8 exert a thrust on the levers 5 in the direction of the arrows F, and when these levers pivot about the pins 6, the levers exert a pressure on the gland 4 via the rollers 7. Said pressure is exerted at two diametrically opposite points; in this way, the packing 3 is compressed uniformly around the shaft 2, thus providing sealing therearound.

When the pump is to be started, the switch 21 is closed, energizing the electrically-operated valve 11 but not the winding 17 of the circuit-breaker 15, since the micro-switch 20 is switched off. Said electrically operated valve then conveys the compressed air to the left-hand compartments of the jacks 9 via the pipes 13; this results in the connecting rods 8 moving in the direction opposite to the arrows F. Said movement rotates the levers 5 about the pins 6 so that the rollers 7 no longer exert pressure on the gland 4. The packing is thus loosened. At the same time, one of the levers 5 operates the micro-switch 20, thereby energizing the winding 17; the contacts 16 of the circuit-breaker 15 close and deliver power to the pump motor, which then starts.

When the pump is turned off, by opening the switch 21, the reverse process takes place.

Firstly, since the winding 17 is no longer energized, the circuit-breaker 15 opens, and the motor of the pump is no longer supplied with current. Likewise, since the electrically-operated valve 11 is no longer supplied with current, it conveys air into the right-hand compartments of the jacks 9, thereby causing the rollers 7 of the levers 5 to exert a pressure on the gland 4 as previously set forth. Sealing is therefore provided when the pump is not operating. Likewise, the micro-switch 20 is switched off, and so on.

It is therefore seen that the device in accordance with the invention allows the pump to start operating only when the packing is loosened. Conversely, as soon as the pump stops operating, the packing is immediately tightened. Also, it is possible to set the time interval between the pump stopping and the tightening of the packing by adjusting the air admission speed into the jacks by means of the regulator 14.

Likewise, it is, of course, possible to adjust the tightening pressure of the packing by adjusting the air pressure by means of the pressure-reducing valve 10.

A specific installation of the device in accordance with the invention will now be described hereinbelow by way of a concrete example.

The pump is a centrifugal pump and it discharges at a rate of 25 m³ per hour. The diameter of the jacks 9 is 50 mm and the stroke of the connecting rods 8 is about 100 mm.

Each lever 5 is 60 mm long. The flat bars 29 and 34 which constitute the levers are 5 mm thick and 35 mm wide, and they are spaced 10 mm apart.

Each jack 9 exerts a force of 120 kg for an air pressure of 6 bars. Since the ratio between the arms of the levers 5 is 1:5, the force exerted on the gland 4 is 600 kg per jack. This is sufficient to provide sealing when the pump is not operating.

It should also be observed that since the packing 3 does not exert any force when the pump is in operation, usual packings which are designed to withstand wear caused by friction on the shaft may be replaced by a simple ring of elastomer material which, when the pump is not operating, requires less tightening pressure to provide sealing.

The invention is advantageously used in any type of pump and in particular in pumps which convey corrosive liquids such as acids.

I claim:

1. A pump shaft sealing device for a pump having a body, a drive shaft extending from the body, and a motor operatively connected to the drive shaft, the device including a stuffing box surrounding the drive shaft where it passes through the pump body, packing disposed in the stuffing box, a packing gland for compressing the packing against the shaft, and means for adjustably pressing the gland against the packing, wherein the improvement comprises:

said means for adjustably pressing the gland against the packing includes at least two levers disposed radially with respect to the axis of the drive shaft in equiangularly spaced relation to each other, each lever having an inner end and an outer end and being pivotally mounted for rotation about an axis located intermediate the inner and outer ends and tangent to a circle concentric with the drive shaft;

drive means coupled to the outer end of each lever for rotating the lever about its pivot axis so as to selectively move the inner end of the lever toward and away from the packing gland; and means for automatically actuating each drive means to cause the inner end of the respective lever to exert a predetermined axial force on the packing gland as soon as the pump motor stops and to release said force before the pump motor starts.

2. A pump shaft sealing device according to claim 1 further comprising a roller rotatably mounted on the inner end of each lever to provide non-friction contact of the lever with the packing gland.

3. A pump shaft sealing device according to claim 2, wherein each lever comprises a pair of parallel spaced apart flat bars, said roller being rotatably mounted between said bars.

4. A pump shaft sealing device according to claim 1, wherein the drive means for each lever comprises a respective double-acting jack having a piston, a chamber on each side of the piston, and a connecting rod linking the piston to the outer end of the lever, and an electrically actuated two-way distribution valve for feeding compressed fluid selectively to one chamber or the other of the jack.

5. A pump shaft sealing device according to claim 4, wherein the means for automatically actuating each drive means comprises a solenoid switch for connecting the pump motor to a source of electrical power;

a main switch for connecting the electrically actuated valve and the coil of the solenoid switch to said source of electrical power; and a normally open limit switch in series with the main switch and the solenoid coil, said limit switch being closed by movement of one of said levers to the released position, so that current will flow to the solenoid coil to start the pump motor only when both the main switch and the limit switch are closed.

6. A pump shaft sealing device according to claim 4, further comprising a fluid pressure reduction valve disposed upstream from said electrically actuated valve and a fluid flow regulator located between said electrically actuated valve and the chambers of said double-acting jacks which are on the sides of the respective pistons opposite the direction of movement for pressing the levers against the packing glands.

7. A pump shaft sealing device according to claim 4, wherein said double-acting jacks further comprise trunnions and means for mounting each jack pivotally in its respective trunnion to assure alignment of the jack axis with the respective connecting rod for the full stroke of the jack.

* * * * *